Patented May 31, 1927.

1,630,836

UNITED STATES PATENT OFFICE.

WILLIAM A. DRUSHEL, OF GRAND RAPIDS, MICHIGAN, ASSIGNOR TO HASKELITE MANUFACTURING CORPORATION, A CORPORATION OF NEW YORK.

INSECTICIDE.

No Drawing.   Application filed October 17, 1923. Serial No. 668,981.

One of the great problems of the householder is to avoid damage to or even destruction of garments, including furs, rugs and other things by moth larvæ and other insect life, and it has become an almost universal custom to place expensive furs in cold storage during the seasons when they are not in use. Other clothing that is not to be used at the time, if not placed in cold storage, must be constantly watched, as must rugs and other things that form food for insects, in order to prevent them from being damaged; this necessity for constantly watching one's goods causing inconvenience and annoyance, even if one happens to be methodical enough not to forget to keep watch.

It has long been known that insect life, even in the egg stage, may be destroyed by maintaining an atmosphere composed of the vapors of any one of several so-called fumigants, and entire rooms have been treated with these fumigants for the purpose of destroying insect life in and on the rugs, furniture and other things forming the furnishings of such rooms, and especially built rooms or chambers have been provided for treating goods of various kinds on a large scale.

If a householder attempts to destroy the insects by fumigating the house, the latter must either be abandoned as a habitation for many hours, or the work must be done one room at a time. In either event the process interferes with the normal use of the house and, since most of the effective fumigating materials have disagreeable odors, it is not pleasant for the householder to go through either of these processes of protecting his goods, and it is therefore very seldom done.

However, so far as I am aware, there has been no simple and convenient way in which householders or others could themselves cleanse insect-infested clothing or other things; cedar chests and the like having no deterrent effect on mature insects already in goods placed in such chests and, at most, being intended to prevent the entrance of insects from without.

The object of the present invention or discovery is to afford householders means to destroy insect life in clothing, rugs or other things in a simple and convenient way, without interference with the normal use of the room or dwelling in which the treatment is taking place, and without causing or leaving any disagreeable odor due to the use of fumigants.

I attain this object by confining clothing, rugs or other things in a closed chamber which is preferably airtight or practically airtight and which may therefore conveniently take the form of a small, tight, portable vault, filling the chamber with a fumigant, and counteracting and neutralizing the obnoxious odors of the fumigant by an agent which, in addition, preferably causes an agreeable odor to be left. The chamber will ordinarily be comparatively small and, whether it be a part of a room or a dwelling, or be a portable vault-like device, will not interfere with the ordinary use of the room or dwelling in which it may be placed, either through physically obstructing the same or through permitting the escape of noxious gases while the chamber is closed or through emitting noxious odors when opened to remove the goods.

I prefer to use carbon disulphid as the fumigant, although carbon tetrachlorid or paradichlorbenzene may be used with success. These compounds, particularly carbon disulphid, give off very disagreeable odors. I have discovered that by producing the gaseous fumigating medium in the presence of certain aromatic substances such as essential oils having high boiling points, the odor of the fumigant will be more or less neutralized. Some of these oils have a very strong odor of their own, which is also agreeable. When these latter oils are used in the proper proportions, there is a substantially complete disappearance of the odor of the fumigant and there remains only the agreeable odor of the oil. The oil which I prefer to use is cedar leaf oil, although cedarwood oil, eucalyptus oil, pine oil, and pine needle oil may be used. The goods or things to be treated are placed in the treating chamber into the upper regions of which are placed the fumigating agent and the neutralizing agent, preferably in such condition that evaporation may take place readily. One manner of applying the fumigant and the oil is to pour them on blotting paper or the like in the top of the chamber. I have found that insect life is extingushed in the course of six or seven hours when about one ounce of carbon disulphid mixture is used for every six cubic feet of space in the chamber, where the chamber is substantially airtight.

The amount of the deodorizing oil that is used depends on the nature of the oil and the nature of the fumigant. Very satisfactory results have been obtained by employing with carbon disulphid an amount of cedar leaf oil equal to from ten to twenty per cent of the weight of the carbon disulphid.

The fumigating and deodorizing agents may be introduced into the chamber in any desired way but, for convenience in distribution and use, I prefer to mix them in the proper proportions so that the user need only pour a predetermined amount of liquid into the treating chamber, after the goods have been placed therein, and then close the door of the chamber, in order to bring about the cleansing of such goods. The mixing of the fumigant and the oil has another advantage, and that is, that a maker of airtight cupboards or vaults can supply the cleansing fluid in bottles each containing a single charge. Thus a portable airtight vault or cupboard capable of very general use, will contain about twelve cubic feet of space, and the owner of such a vault may therefore be supplied with say two ounce bottles of a mixture of carbon disulphid and cedar leaf oil, and be instructed to use one such bottle for each charge, that is, for each lot of clothes or other things that may be treated.

It will thus be seen that my invention makes it possible for a householder thoroughly to cleanse clothing, furs, rugs and other goods subject to attack by insects, with practically no more labor than is required to place the goods in a suitable chamber provided for that purpose, and without being subjected to discomfort or inconvenience, either during the process of treatment or afterwards, on account of the use of fumigants having disagreeable odors. Furthermore, this treatment may be given at any desired time and as frequently as desired, because no special preparation need be made and the objects that need treatment being kept out of use only a short time and being ready to be worn or used immediately upon the completion of the treatment. The great expense of storing furs and other expensive goods that will be attacked by insects may therefore be entirely avoided; and rugs and other things that are constantly in use may be cleansed of insects as frequently as the householder suspects that there may be a necessity therefor, without withdrawing them from use except for a few hours, or not at all if the treatment be allowed to take place during the night.

I claim:

1. A compound for the purpose specified, consisting of carbon disulphide mixed with cedar leaf oil.

2. A compound for the purpose specified, consisting of cedar leaf oil mixed with from five to ten times as much carbon disulphide.

In testimony whereof, I sign this specification.

WILLIAM A. DRUSHEL.